United States Patent [19]

Handy

[11] Patent Number: 4,557,335

[45] Date of Patent: Dec. 10, 1985

[54] WING SECTION ROD WEEDER WITH MATING COUPLING COMPONENTS

[76] Inventor: Barry L. Handy, Box 2520, Scobey, Mont. 59263

[21] Appl. No.: 479,807

[22] Filed: Mar. 28, 1983

[51] Int. Cl.⁴ ............................................. A01B 39/19
[52] U.S. Cl. ...................................... 172/44; 172/125; 172/311; 172/662; 403/74; 403/115
[58] Field of Search .................... 172/44, 81, 123, 125, 172/75, 103, 311, 662; 464/112; 403/74, 77, 114, 115, 116, 123, 299

[56] References Cited

U.S. PATENT DOCUMENTS

| | | | |
|---|---|---|---|
| 2,687,024 | 8/1954 | George | 464/112 |
| 2,957,715 | 10/1960 | Berky | 464/112 X |
| 3,186,494 | 6/1965 | Jackson | 172/44 |
| 3,360,053 | 12/1967 | Doepker | 172/44 |
| 3,768,425 | 10/1973 | Seifert, Jr. | 172/44 X |
| 3,827,504 | 8/1974 | Zimmerman | 172/44 |
| 4,214,633 | 7/1980 | Jackson et al. | 172/123 |

Primary Examiner—Richard T. Stouffer
Attorney, Agent, or Firm—Harvey B. Jacobson

[57] ABSTRACT

A wing section equipped rod weeder implement is provided wherein the implement includes a center section and a pair of opposite side wing sections which may be swung upwardly to retracted positions for moving along roadways or through narrow fence openings. The center section rod weeder shaft is driven by a reversible variable speed hydraulic motor and the opposite ends of the center section rod weeder shaft include universal joints removably supported therefrom for selective reversed mounting on the center section rod weeder shaft ends and each universal joint defines a swivelly supported inwardly tapering threaded socket. The adjacent ends of the wing section rod weeder shafts include tapered threaded male ends removably threaded within the sockets. The threaded connections are of the non-jamming type wherein they may be readily unthreaded. Further the universal joints are equipped with releasable latch structures which automatically retain the universal joints in centered positions responsive to the tapered male rod weeder ends being initially unthreaded therefrom and automatically release to enable full universal movement responsive to final threaded engagement of the tapered male rod weeder ends therewith.

8 Claims, 6 Drawing Figures

WING SECTION ROD WEEDER WITH MATING COUPLING COMPONENTS

BACKGROUND OF THE INVENTION

Various forms of wing section equipped rod weeder shafts heretofore have been provided with rod weeder shafts driven from a single hydraulic motor drivingly coupled to the center section rod weeder shaft. In such instances the couplings between the main section rod weeder shaft and the wing section rod weeder shafts must be disassembled each time the wing sections are raised and reassembled each time the wing sections are lowered. This requires the operator of the associated tractor to dismount each time the wing sections are to be raised and lowered and to spend considerable time in uncoupling or recoupling the wing section rod weeder shafts to the opposite ends of the main center section rod weeder shaft. Accordingly, a need exists for structure whereby the couplings between a main section rod weeder shaft and the wing section rod weeder shafts may be accomplished from a remote location such as the operator's position of an associated tractor. In addition, it is also important that such couplings may be operative whether the rod weeder shafts are to be turned in one direction or the other direction when performing a rod weeding operation.

Examples of various forms of universal couplings including some of the general structural and operational features of the instant invention are disclosed in U.S. Pat. Nos. 1,780,383, 2,772,659 and 3,675,953.

BRIEF DESCRIPTION OF THE INVENTION

The rod weeder implement of the instant invention is of the wing section equipped type and is constructed in a manner whereby the central rod weeder section may be drivingly coupled to and uncoupled from the wing section rod weeder shafts by the operator of the associated tractor without the operator dismounting from the tractor and without bringing the tractor to a halt. Each of the coupling assemblies utilized to drivingly couple the center rod weeder shaft to an adjacent wing section rod weeder shaft includes a tapered threaded connection of the non-jamming type and the threaded portions of the right and left hand coupling assemblies are oppositely threaded and removably supported from the opposite ends of the main or center section rod weeder shaft and the adjacent ends of the wing section rod weeder shafts. This enables the releasable coupling assemblies to function while rotating in either direction during a rod weeding operation merely by selectively mounting the oppositely threaded coupling assemblies on the opposite ends of the main or center and wing section rod weeder shafts. In addition, each of the coupling assemblies includes a universal joint and each universal joint includes latch structure operable to retain the universal joint in a center position upon initial unthreading of the associated wing section rod weeder shaft therefrom. Further, the universal joints and corresponding latch structures are also operative to automatically release the universal joints for full swiveling movement thereof upon final threaded engagement of the associated wing section rod weeder shafts therewith.

The main object of this invention is to provide an improved rod weeder implement of the wing section equipped type and constructed in a manner whereby the wing sections may be readily folded and unfolded by the operator of an associated tractor without the operator having to manually uncouple or recouple the opposite ends of the center main rod weeder shaft to the adjacent ends of the wing section rod weeder shafts.

Another object of this invention is to provide a rod weeder implement in accordance with the preceding object and constructed in a manner whereby threaded connections may be used between the main and wing section rod weeder shafts and yet allow the entire rod weeder assembly to be selectively driven in either direction.

Still another important object of this invention is to provide an improved rod weeder implement which may have the improvement features thereof retrofitted to existing rod weeder implements of the wing section equipped type.

A final object of this invention to be specifically enumerated herein is to provide a rod weeder implement in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
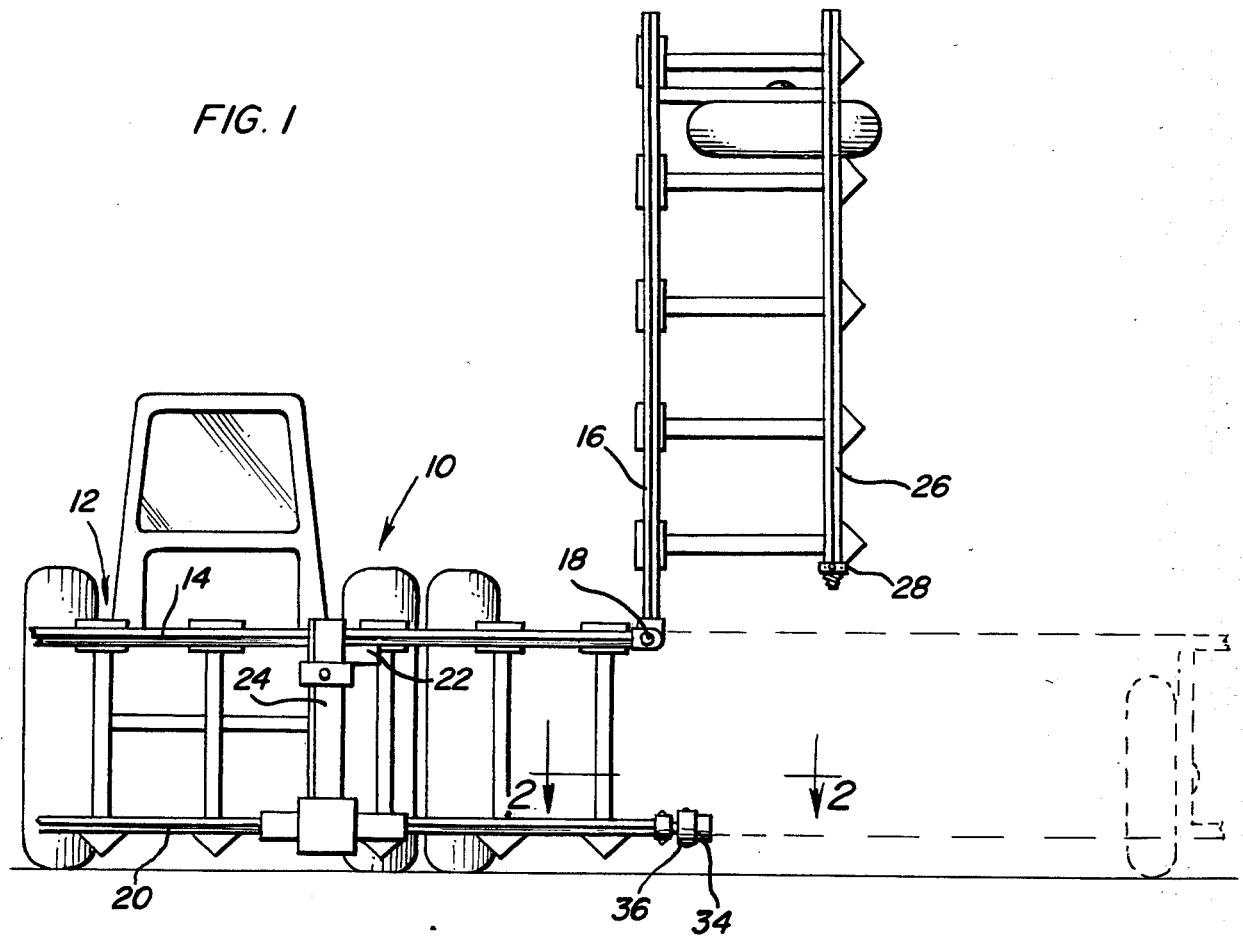
FIG. 1 is a fragmentary rear elevational view of a typical form of rod weeder implement of the wing section equipped type and incorporating the improvement structure of the instant invention.
Figure 2:
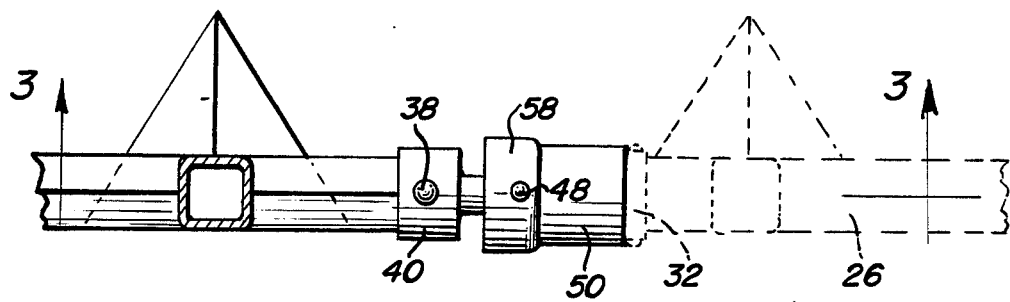
FIG. 2 is an enlarged fragmentary horizontal sectional view taken substantially upon the plane indicated by the section line 2—2 of FIG. 1.

Referring now more specifically to the drawings the numeral 10 generally designates a conventional form of farm tractor including a suitable hitch assembly (not shown) from which a rod weeder implement referred to in general by the reference numeral 12 is supported. The rod weeder implement 12 includes a center section 14 and a pair of opposite side wing or extension sections 16 each pivotally mounted as at 18 to a corresponding end of the transversely extending center section 14. Only the right hand wing section 16 is illustrated, but it is to be understood that the left hand end of the center section 14 is also provided with a wing section.

The center section 14 rotatably journals a lower center section rod weeder shaft 20 driven from a reversible variable speed hydraulic motor 22 through a drive train assembly 24. The center section rod weeder shaft 20 may comprise a single rod which extends through the lower portion of the drive train assembly 24 or a pair of axially spaced rod weeder shafts whose adjacent ends are driven from and coupled together by the lower portion of the drive train assembly 24. In any event, the rod weeder shaft 20 includes opposite end portions disposed at the terminal ends of the transverse center section 14.

Each of the wing or extension sections 16 rotatably journals a lower wing section rod weeder shaft 26 therefrom and the rod weeder shafts 26 include oppositely threaded coupling members 28 and 30 removably supported therefrom through the utilization of removable fasteners 32.

Any suitable form of hydraulic motors or cylinders (not shown) may be operatively connected between the center section 14 and the wing sections 16 for swinging the latter between the lowered phantom line position illustrated in FIG. 1 and the raised solid line position illustrated in FIG. 1. Further, these cylinders or motors as well as the hydraulic motor 22 may be operated by the hydraulic system (not shown) of the associated tractor 10.

The opposite ends of the center section rod weeder shaft 20 are equipped with oppositely threaded coupling members 34 and each of the threaded coupling members 34 comprises a part of a universal joint 36 removably mounted on the corresponding end of the rod weeder shaft 20 by a removable fastener 38.

Each of the universal joints 36 includes a first section 40 supporting a ball element 42 therefrom slotted as at 44 and provided with a radial blind bore 46. A diametric pin 48 passes through each slot 44 and a second section 50 of each universal joint 36. Each second section 50 defines a spherical socket 52 in which the corresponding ball element 42 is captively received and each second section comprises one of the coupling members 34. The second sections 50 include oppositely threaded tapered sockets 54 in which the corresponding threaded coupling member 28,30 is removably threadedly engaged and the inner end of each socket 54 is of limited cross sectional area and opens into the innermost end of the corresponding spherical socket 52. Each radial bore 46 has a latch pin 56 slidably disposed therein and yieldingly biased to an outermost position by a compression spring 58. The latch pins 56 are receivable in the innermost ends of the sockets 54 when the coupling members 30 are removed therefrom in order to maintain the coupling members 34 or second sections 50 in centered positions against universal movement relative to the first sections 40. However, when the coupling members 30 are fully threadedly engaged in the sockets 54, the inner ends of the coupling members 30 abut and inwardly displace the latch pins 56 in order to retract the same relative to the outer surface of the ball elements 42 and allow swiveling movement of the coupling members 34 or second sections 50 relative to the ball elements 42.

Figure 3:
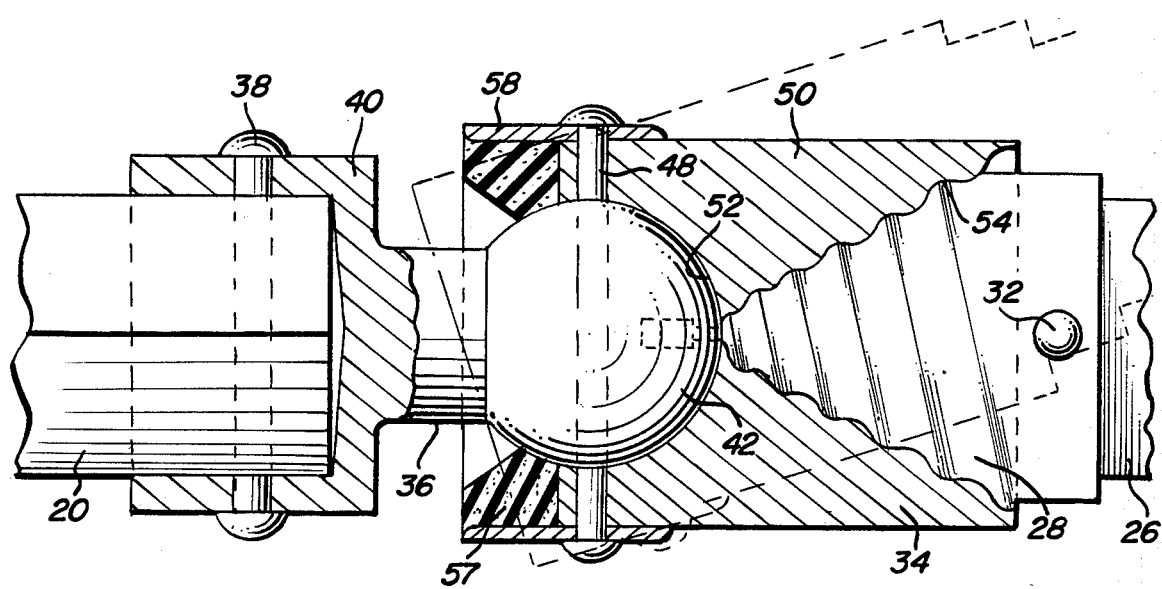
FIG. 3 is a further enlarged vertical section view taken substantially upon the plane indicated by the section line 3—3 of FIG. 2.
Figure 4:
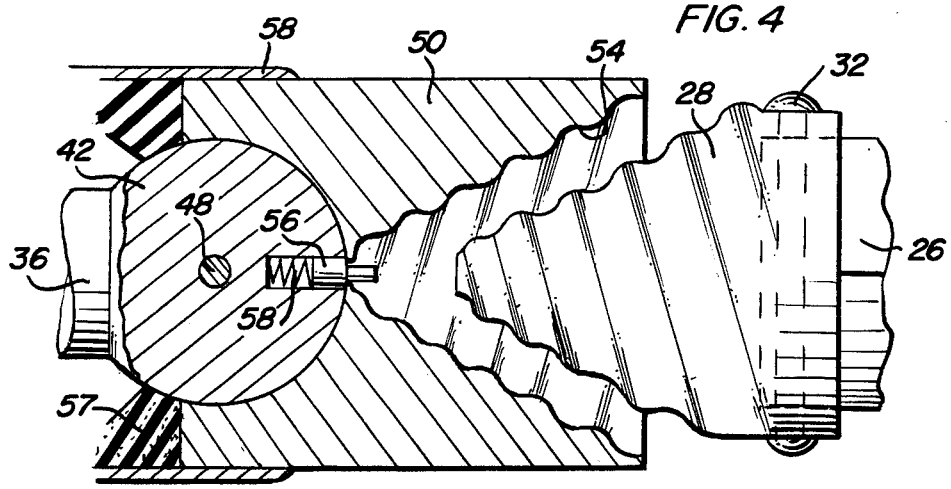
FIG. 4 is a fragmentary horizontal sectional view of the structure illustrated in FIG. 3 and illustrating the end of a wing section rod weeder shaft in position to be threaded into the tapered threaded socket of the universal joint mounted on the main or center section rod weeder shaft.
Figure 5:
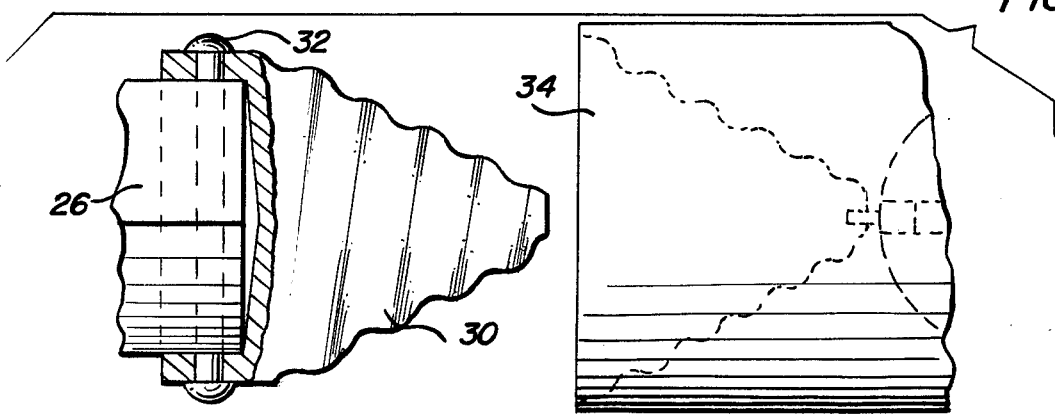
FIG. 5 is an exploded elevational view of the threaded connection between the left hand wing section rod weeder shaft and the left end of the main or central rod weeder shaft illustrated in FIG. 1.
Figure 6:
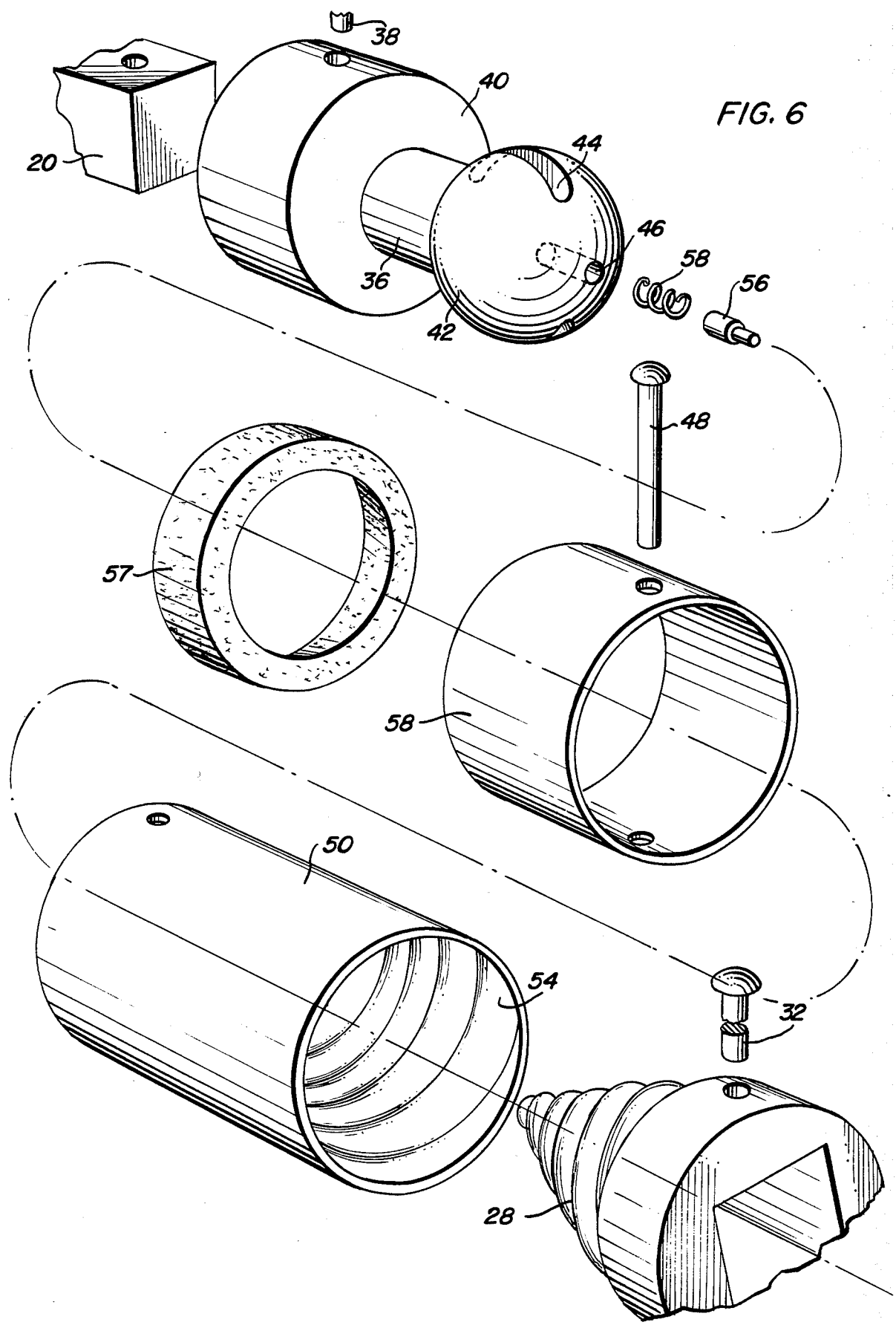
FIG. 6 is an exploded perspective view of one of the combined universal joint and coupling structures.

From FIG. 3 of the drawings it may be seen that the sockets 52 comprise substantially hemispherical sockets formed in the second sections 50 and that the open ends of the sockets 52 are partially closed by annular resilient bodies 57 secured within mounting sleeves 58 pressed on the ends of the second sections 50 remote from the sockets 54. Accordingly, the ball elements 42 are anchored within the sockets 52 against withdrawal therefrom. However, rotary torque applied to the center section rod weeder shaft 20 from the hydraulic motor 22 is transferred from each of the first sections 40, through the pins 48 to the second sections 50.

In operation, assuming that the wing sections 16 are raised in the manner illustrated in solid lines in FIG. 1 of the drawings and that the latch pins 56 are operative to retain the second sections of the universal joints 36 in centered positions against universal movement relative to the first sections 40, as the wing sections 16 are swung downwardly to the phantom line position illustrated in FIG. 1 the threaded and tapered coupling members 28, 30 will automatically be swung into the tapered and threaded sockets 54. After the coupling members 28, 30 have been seated within the sockets 54 independent of threaded connections therewith, the hydraulic motor 72 is operated in the correct direction in order to cause the second sections 50 to be threaded onto the coupling members 28,30. After the second sections 50 have been fully threadedly engaged with the coupling members 28, 30, rotational torque applied to the rod weeder section 20 will be automatically transferred to the rod weeder sections 26. Of course, as the coupling members 28, 30 are fully threadedly seated within the sockets 54, the inner ends thereof will cause the corresponding latch pins 56 to be inwardly retracted relative to the associated ball members 44 and thus allow the second sections 50 of the universal joints 36 to swivel relative to the first sections 40 thereof as the implement 12 moves over uneven ground.

When it is subsequently desired to again upwardly swing the wing sections 16, the motor 22 is operated in a reverse direction in order to cause the second sections 50 of the universal joints 38 to be unthreaded from the coupling members 28, 30. As the second sections 50 are unthreaded from the coupling members 28, 30 the latch pins 56 are outwardly biased by the springs 58 and thus lock the second sections 50 in their centered positions against angular displacement relative to the first sections 40. Thereafter, the wing sections 16 may be raised to the phantom line position illustrated in FIG. 1.

Inasmuch as in some instances rod weeder shafts are driven in one direction while other instances require rotation of rod weeder shafts in the opposite direction, the coupling members 28, 30 are removably supported from the rod weeder shafts 26 and thus may be reversed in position thereon. Further, the universal joints 36 are removably supported from the opposite ends of the rod weeder shaft 20 and thus may also be reversed in position thereon. This will enable desired rotation of the rod weeder shafts 20 and 26 during a rod weeding operation to maintain the threaded connections between the coupling members 28, 30 and 34 tight at all times, except when rotation of the rod weeder section 20 is reversed in order to uncouple the second sections 50 from the coupling members 28, 30.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a hinged wing section equipped implement of the type including a first stationary horizontally elongated section and a second horizontally elongated extension section, means pivotally connecting one end of said extension section to a first end of said stationary section as an extension thereof and for angular displacement of said extension section relative to said stationary section between a first horizontal extended position projecting outwardly from said first end and a second upstanding folded position projecting upwardly from said first end, a first reversible motor driven rod weeder shaft journalled from said stationary section below the latter, an extension rod weeder shaft journalled from said extension section below the latter and aligned with the adjacent end of said first rod weeder shaft when said extension section is in the horizontal position thereof, the adjacent ends of said shafts including mating tapered male and female threaded coupling members supported therefrom and removably threadedly joined together, said tapered male and female threaded coupling members coacting to define threaded coupling means operable to establish a supportive and driving coupling between said coupling members upon projection of said male coupling member into said female coupling member and subsequent rotation of the coupling member supported from said first rod weeder shaft in one direction of rotation relative to the coupling member supported from said extension rod weeder shaft, and further to uncouple the coupling member carried by said first rod weeder shaft from the coupling member carried by said extension rod weeder shaft upon rotation of said first rod weeder shaft in the other direction against the inertia of said extension rod weeder shaft resisting rotation thereof in said other direction.

2. The implement of claim 1 wherein said female coupling member is supported from said first rod weeder shaft by a universal connection therewith including latch structure automatically preventing universal movement of said female coupling component relative to said first rod weeder shaft upon initial unthreading of said female coupling member from male coupling member and coacting with said male coupling member upon subsequent full threaded engagement of said female coupling member with said male coupling member releasing said latch structure to allow universal movement of said female coupling member relative to said first rod weeder shaft.

3. The implement of claim 1 wherein said first section includes a second end, a second extension section pivotally supported from said second end, said second extension section including a second extension rod weeder shaft journalled therefrom and aligned with the adjacent end of said first rod weeder shaft, the adjacent ends of said first rod weeder shaft and said second extension rod weeder shaft being removably joined by second mating tapered male and female threaded coupling components supported therefrom and removably threadedly joined together, said tapered male and female threaded components coacting to define threaded coupling means operable to establish a supportive and driving coupling between said components upon projection of said male coupling component into said female coupling component and rotation of the coupling component supported from said first rod weeder shaft in said one direction of rotation relative to the coupling component supported from said second extension rod weeder shaft, and further to uncouple the coupling component carried by said first rod weeder shaft from the coupling component carried by said second extension rod weeder shaft upon rotation of said first rod weeder shaft in the other direction against the inertia of said second extension rod weeder shaft resisting rotation thereof in said other direction, the threads on said coupling members components being reversed relative to each other.

4. The implement of claim 3 wherein said female coupling member and said female coupling component each are supported from the corresponding rod weeder shaft by a universal connection including latch structure operative to automatically prevent universal movement thereof relative to the corresponding rod weeder shaft upon initial unthreading of said female coupling member and female coupling component from the corresponding male coupling member and male coupling component and coacting with said male coupling member and male coupling component upon subsequent full threaded engagement of said female coupling member and female coupling component with said male coupling member and male coupling component to allow universal movement of said female coupling member and female coupling component relative to said first rod weeder shaft.

5. The implement of claim 3 wherein said coupling members and coupling components are removably mounted on the corresponding rod weeder shaft ends and comprise, generally, coacting couplers, the couplers on opposite ends of said first rod weeder shaft each being substitutable for the other and the couplers on the extension rod weeder shafts each being substitutable for the other.

6. In combination with a hinged wing section equipped implement of the type including a first stationary horizontally elongated section and a second horizontally elongated extension section, means pivotally connecting one end of said extension section to a first end of said stationary section as an extension thereof and for angular displacement of said extension section relative to said stationary section between a first horizontal extended position projecting outwardly from said first end and a second upstanding folded position projecting upwardly from said first end, a first reversible motor driven rod weeder shaft journalled from said stationary section below the latter, an extension rod weeder shaft journalled from said extension section below the latter and aligned with the adjacent end of said first rod weeder shaft when said extension section is in said horizontal position, the adjacent ends of said shafts including mating tapered male and female coupling components, said mating tapered male and female components coacting to define coupling means operative to establish a supportive and driving coupling between said components upon projection of said male coupling component into said female coupling component and rotation of the coupling components supported from said first rod weeder shaft in one direction or rotation relative to the coupling component supported from said extension rod weeder shaft, and further operable to uncouple the coupling component carried by said first rod weeder shaft from the coupling component carried by said extension rod weeder shaft upon rotation of said first rod weeder shaft in the other direction against the inertia of said extension rod weeder shaft resisting rotation thereof in said other direction.

7. The implement of claim 6 wherein said female coupling component is supported from said first rod weeder shaft by a universal connection and includes a latch structure for automatically preventing universal movement of said female coupling component relative to said first rod weeder shaft upon initial uncoupling of said female coupling component from said male coupling component and coacting with said male coupling component upon substantially full coupling engagement with said male coupling member to release said latch structure and allow full universal movement of said female coupling component relative to said first rod weeder shaft.

8. In combination with a hinged wing section equipped implement of the type including a first stationary horizontally elongated section and a second horizontally elongated extension section, means pivotally connecting one end of said extension section to a first end of said stationary section as an extension thereof and for angular displacement of said extension section relative to said stationary section between a first horizontal extended position projecting outwardly from said first end and a second upstanding folded position projecting upwardly from said first end, a first reversible motor driven rod weeder shaft journalled from said stationary section below the latter, an extension rod weeder shaft journalled from said extension section below the latter and aligned with the adjacent end of said first rod weeder shaft when said extension section is horizontally disposed, the adjacent ends of said shafts including mating male and female coupling components of the type which may be coupled together upon initial axial engagement and subsequent relative rotational movement, one of said coupling components being supported from said first rod weeder shaft by a universal coupling including latch structure releasably retaining said universal coupling in a center position against universal movement relative to said first rod weeder shaft, said latch structure and the other coupling component including coacting means operative to automatically prevent universal movement of said one component upon initial disengagement of said components and to automatically restore universal movement capacity of said one component upon final engagement of said components.

* * * * *